United States Patent [19]

Lee

[11] Patent Number: 5,753,978
[45] Date of Patent: May 19, 1998

[54] FLOATER ENERGY GENERATOR HAVING A ROTATABLE BLADE WHEEL

[76] Inventor: Chih-Chiang Lee, Floor 4-11, No. 38, Kuo Tai Street, Pan Chao City,Taipei Hsien, Taiwan

[21] Appl. No.: 676,479

[22] Filed: Jul. 8, 1996

[51] Int. Cl.⁶ .................................. F03B 13/00; H02P 9/04
[52] U.S. Cl. .......................... 290/54; 290/10; 290/42; 290/53; 290/43
[58] Field of Search .......................... 290/1 D, 53, 54, 290/42; 60/639, 398, 721, 675; 415/92, 183

[56] References Cited

U.S. PATENT DOCUMENTS

| | | | |
|---|---|---|---|
| 1,276,112 | 8/1918 | Reed | 290/1 D |
| 3,987,307 | 10/1976 | Giconi | 290/1 D |
| 4,113,410 | 9/1978 | Ando | 417/502 |
| 4,171,189 | 10/1979 | Schreiber | 417/332 |
| 4,246,753 | 1/1981 | Redmond | 60/398 |
| 4,258,269 | 3/1981 | Tsubota | 290/53 |
| 4,296,602 | 10/1981 | Hales et al. | 60/398 |
| 4,538,415 | 9/1985 | Lebecque | 60/639 |
| 4,598,211 | 7/1986 | Koruthu | 290/53 |
| 5,311,064 | 5/1994 | Kumbatovic | 290/53 |
| 5,488,828 | 2/1996 | Brossard | 60/675 |

*Primary Examiner*—Steven L. Stephan
*Assistant Examiner*—Elvin G. Enad
*Attorney, Agent, or Firm*—Bacon & Thomas

[57] ABSTRACT

Disclosed is a floater energy generator which includes a sealable water tank to create inside the water tank a water and an air pressure smaller than an external atmospheric pressure, such that water inside the tank will not overflow the tank from a lower manifold. Floaters are sent into the water tank via the lower manifold and are allowed to float and stay in a space left in a top portion of the water tank, such that when an upper outlet of the tank is opened, the floaters are allowed to fall out of the tank to impact on blades of a blade wheel disposed below the water tank, causing the blade wheel to rotate continuously and generates kinetic energy output. The floaters and water in the water tank can be recovered for repeated use.

4 Claims, 11 Drawing Sheets

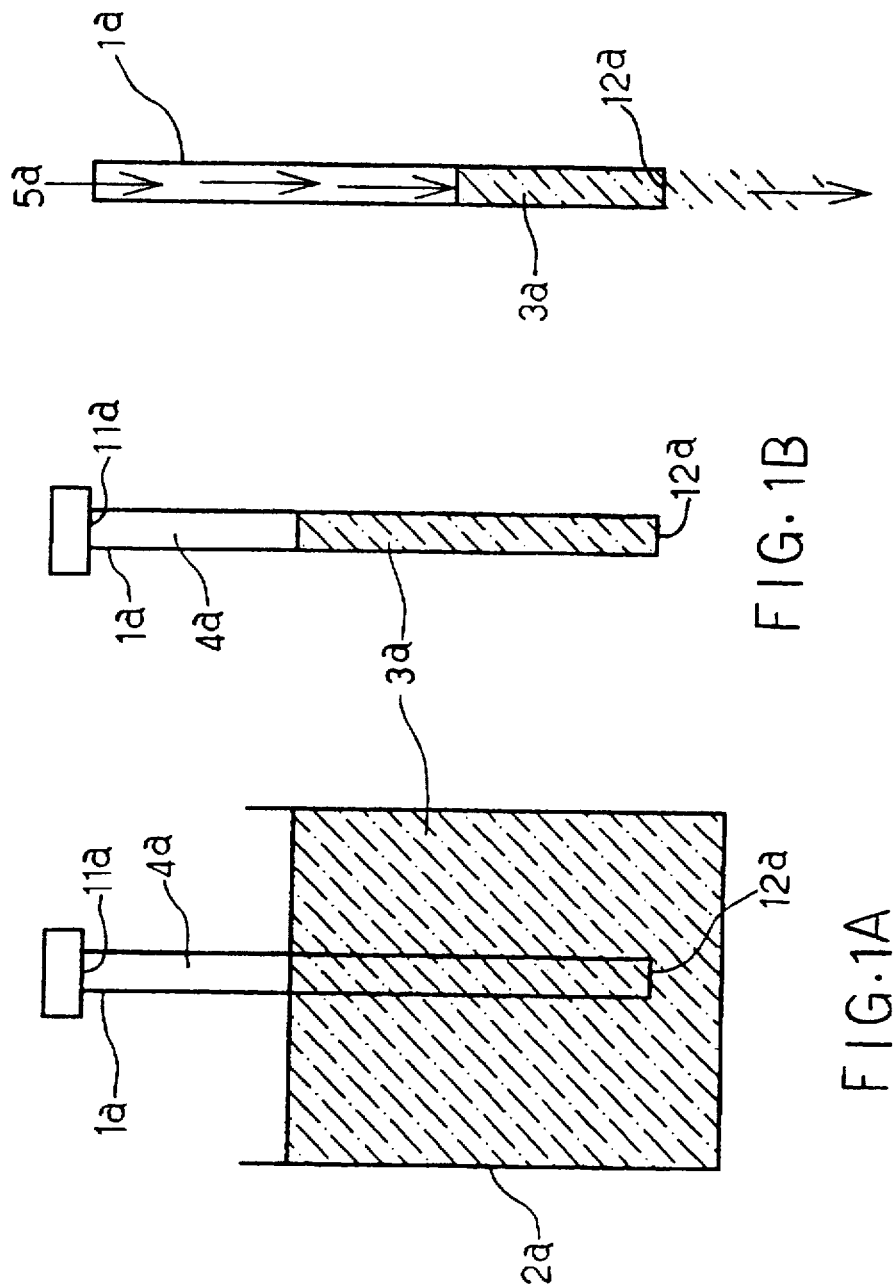

FLOATER ENERGY GENERATOR HAVING A ROTATABLE BLADE WHEEL

BACKGROUND OF THE INVENTION

Conventional power sources generally come from natural sources, including coal, gas, kerosene, petroleum, nuclear energy, solar energy, water, wind, geothermal energy, etc. Among these natural sources, coal and petroleum generate thermal energy through burning. The thermal energy is then transformed into mechanical energy or electric energy for the power required in our daily life. The nuclear energy is generated by putting and impacting uranium material in a nuclear reactor so that uranium fission occurs to instantaneously release tremendous energy which can be used to supply the power we need everyday. These natural sources have great contribution to human material civilization. On the other hand, waste gases of carbon dioxide produced from burning of coal and of hydrocarbons from burning of petroleum have badly polluted our air, causing worldwide greenhouse effect which in turn causes dramatic changes in the temperatures all over the world and adversely affects the living condition on the earth. In addition, it is also a difficult problem to dispose radioactive hazardous waste from nuclear reaction. What is more important is the fact that these natural sources are limited sources on the earth and therefore, they can be used up someday. As to the solar energy, water, wind and geothermal energy, although they are non-pollution energy sources, they are frequently restricted by the natural environment. For instance, solar energy can be obtained only at places where have sufficient sunshine, water can be utilized only at places where rivers flow and have sufficient rain. Similarly, utilization of wind and geothermal energy is also limited by the natural environment. It is therefore a big challenge to all human in the future to create the required energy for power generation from the existing limited sources.

SUMMARY OF THE INVENTION

It is therefore a primary object of the present invention to provide a floater energy generator in which floaters are used in the energy generation to replace the natural sources without wasting them. And, the use of such floaters in the energy generation will not pollute our living environment nor will it be restricted by the natural environmental conditions.

Another object of the present invention is to provide a floater energy generator which utilizes only small energy consumation to generate tremendous energy output.

A further object of the present invention is to provide a floater energy generator which permits the produced energy as a power source to be repeatedly utilized.

BRIEF DESCRIPTION OF THE DRAWINGS

The above and other objects of the present invention, the structure and functions thereof as well as the technical means adopted by the present invention to achieve the above objects can be best understood by referring to the following detailed description of the preferred embodiment and the accompanying drawings, wherein FIGS. 1A, 1B and 1C are schematic drawings explaining a first physical principle and phenomena employed in the present invention;

DETAILED DESCRIPTION OF THE PREFERRED EMBODIMENTS

Figure 2C:
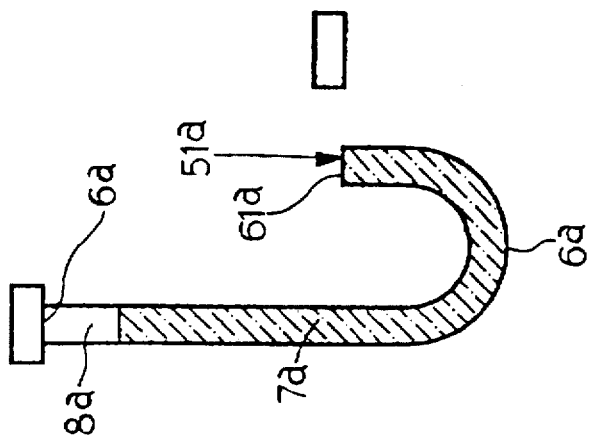
FIGS. 2A, 2B and 2C are schematic drawings explaining another physical principle and phenomena employed in the present invention.

Please refer to FIGS. 1A, 1B and 1C which explain a first physical principle and phenomena empolyed in the present invention. When a straw 1a having a sucking outlet 1a and a sucking inlet 12a is placed into a liquid-contained cup 2a with the sucking outlet 11a in an open state, liquid 3a flown into and left in the straw 11 is in a height the same as that of liquid in the cup 2a. When the straw 1a is closed or pinched at the sucking outlet 11a and the cup 2a is removed, the liquid 3a in the straw 1a shall keep staying therein without flowing out of the straw 1a from the sucking inlet 12a due to the weight of liquid 3a itself. This is because air 4a and the liquid 3a in the straw 1a with closed sucking outlet 11a has an inner pressure smaller than an atmospheric pressure 5a outside the straw 1a. On the contrary, when the sucking outlet 11a of the straw 1a is opened or released again, air outside the straw 1a enters the straw 1a, causing the pressures inside and outside the straw 1a to be the same with each other, and therefore, the liquid 3a shall flow out of the straw 1a from the sucking inlet 12a due to its own weight.

Figure 2B:
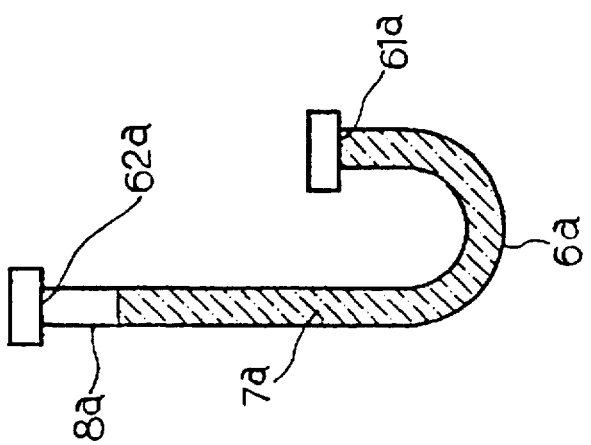
Figure 2A:
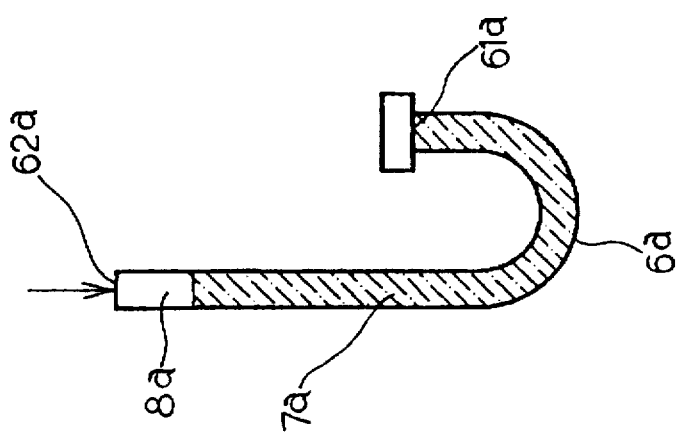
Figure 3:
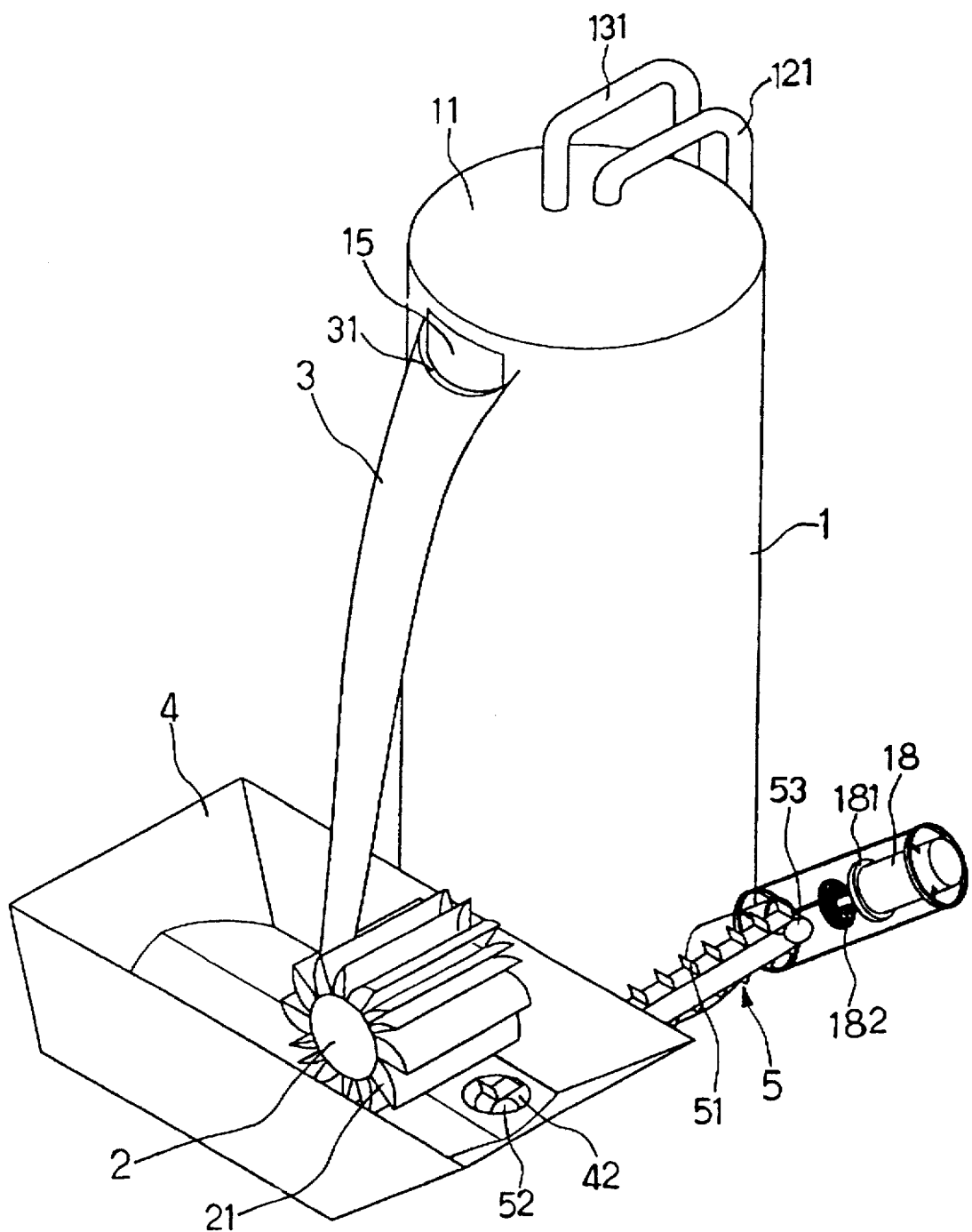
FIG. 3 is a schematic perspective showing the floater energy generator according to the present invention.
Figure 4:
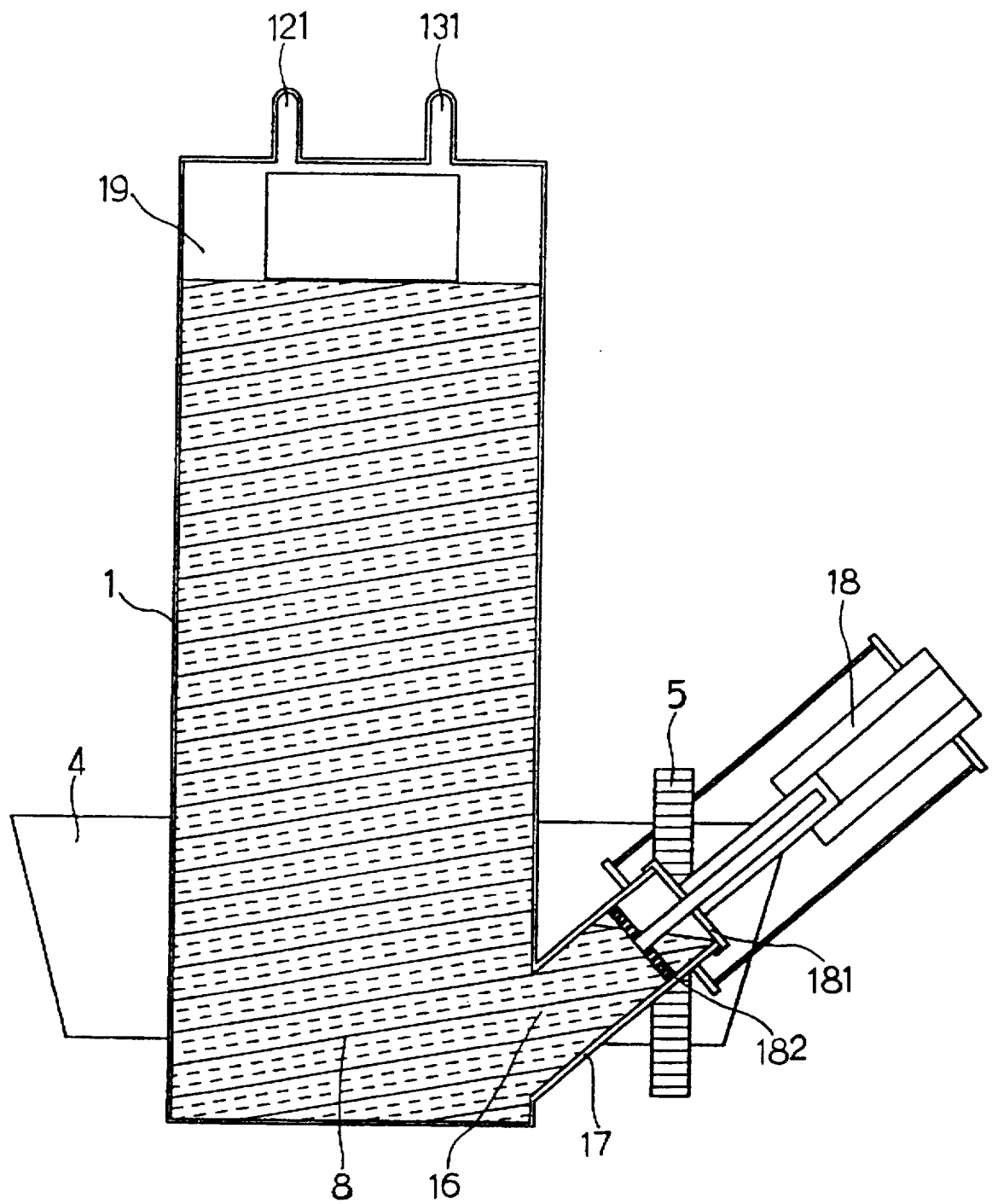
FIG. 4 is a sectional side view of the present invention with a water tank thereof filled with water.
Figure 5:
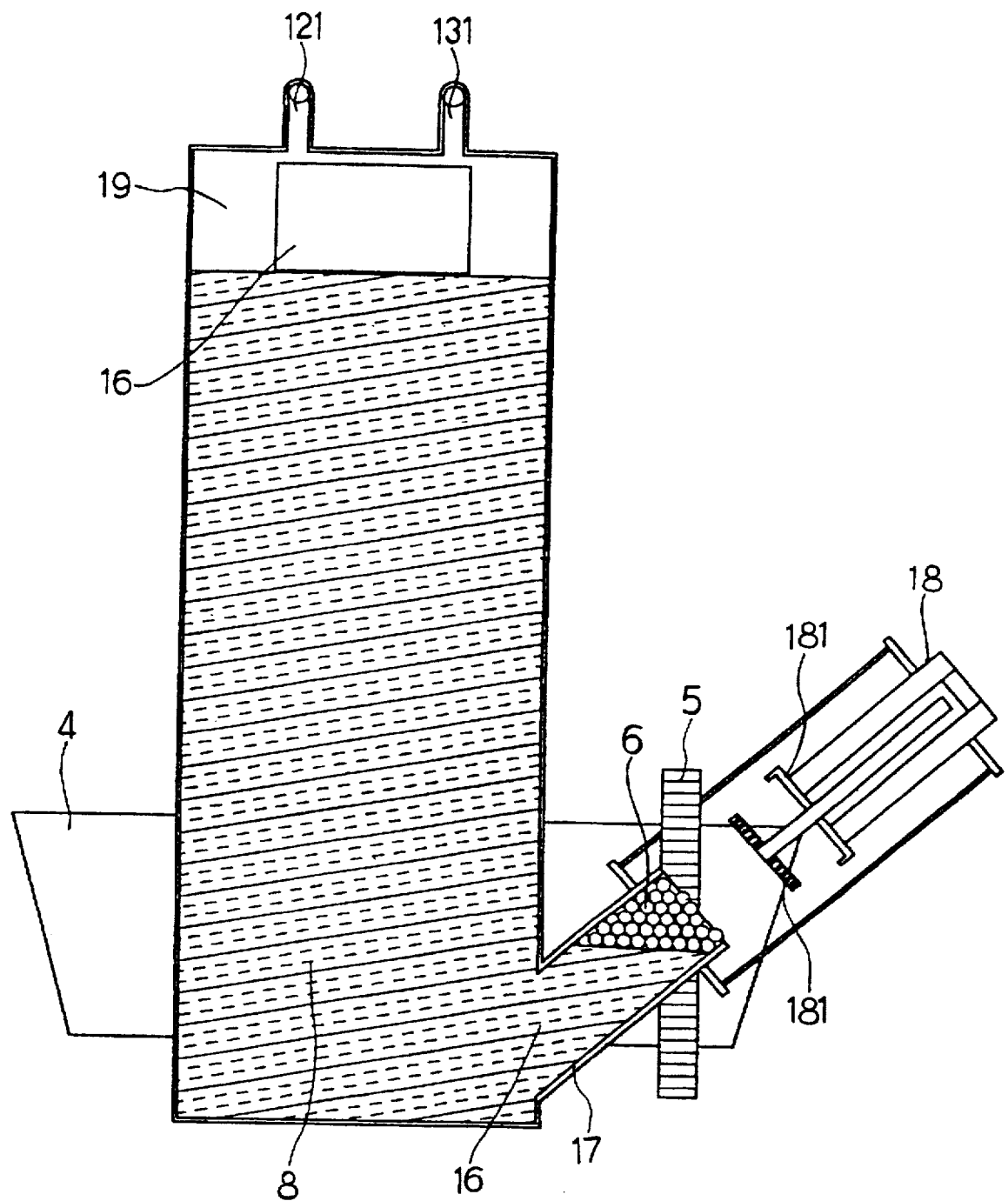
FIG. 5 is a sectional side view of the present invention with the water tank filled with water and floaters being provided to the water tank from a manifold thereof.
Figure 6:
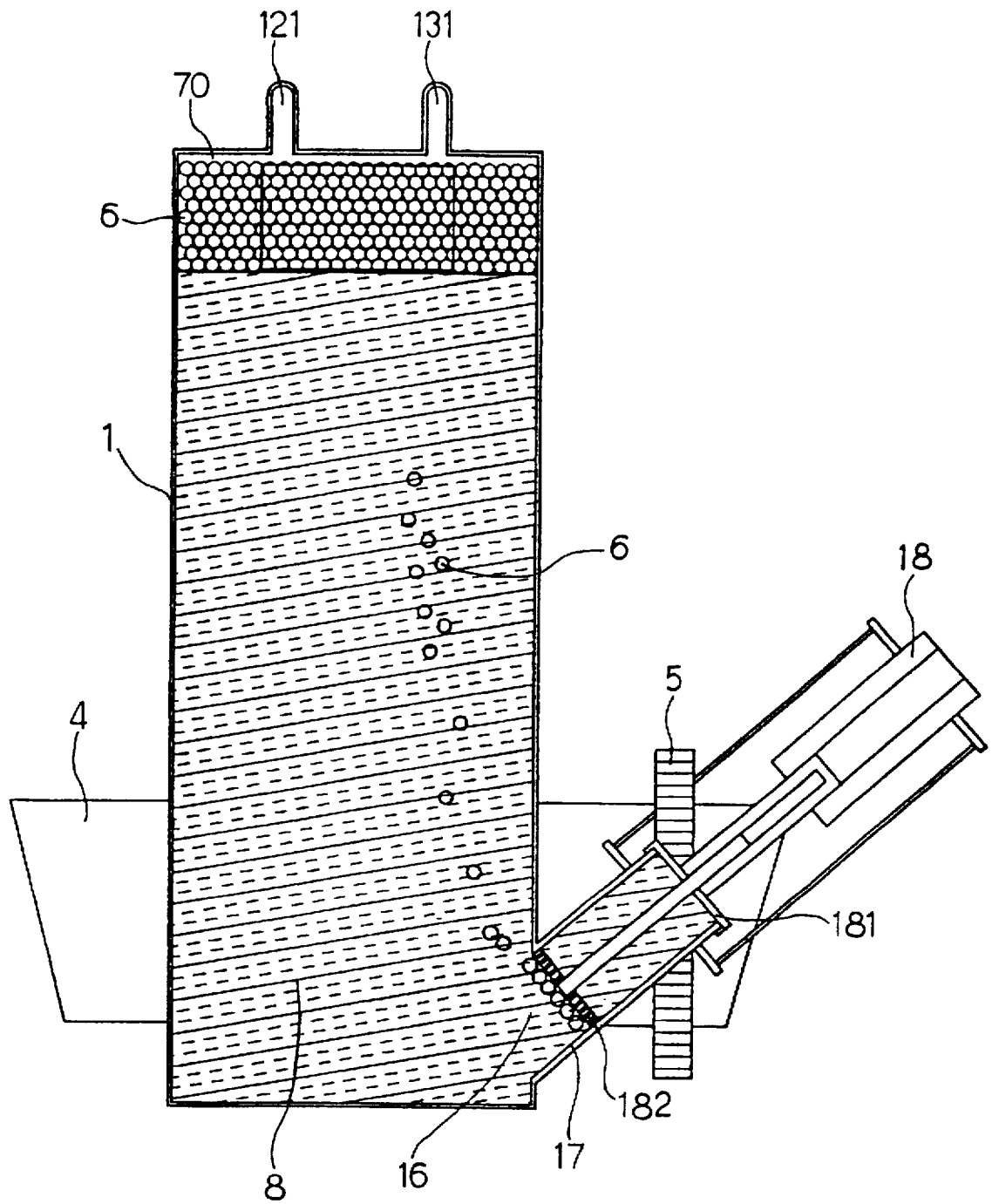
FIG. 6 is similar to FIG. 5 but with the floaters pushed into and floating on a water surface inside the water tank.

FIGS. 2A, 2B and 2C illustrate another similar physical principle and phenomena employed in the present invention. A J-shaped straw 6a having a sucking inlet 61a and a sucking outlet 62a is filled with water 7a from the sucking outlet 62a while the sucking inlet 61a is closed. Then, the sucking outlet 62a is closed and the sucking inlet 61a is opened. At this point, water 7a in the straw 6a keeps in the straw 6a without overflowing therefrom because the pressure from the water 7a and the air 8a in the straw 6a is smaller than the outside atmospheric pressure.

The above physical principles and phenomena can be employed in association with some structural arrangements to form an energy generator which consumes only small energy to generate tremendous energy output. Following is a detailed description of the energy generator of the present invention structured based on these physical principles and phenomena.

Please refer to FIGS. 3 through 8. The energy generator of the present invention mainly includes a water tank 1, a blade wheel 2, a chute 3, a hopper 4, and a conveyor 5.

The water tank 1 has a closed top cover 11 which isolates an inner space of the water tank 1 from an outside atmospheric pressure. A water inlet 12 and an air regulating port 13 are formed on the top cover 11 to respectively connect an inlet water pipe 121 and an air pressure regulating pipe 131 thereto. A floater outlet 14 is formed on a side wall of the water tank 1 near an upper portion thereof. A double-wall airtight gate 15 is mounted to the floater outlet 14. A through hole 16 is provided to the side wall of the water tank 1 near a lower portion thereof. The through hole 16 is so positioned that, when viewing from a top plan of the water tank 1, it is substantially angularly separated from the floater outlet 14 by 90 degrees. A manifold 17 is connected to the through hole 16 and outward and upward extends therefrom. To an outer opening 171 of the manifold 17, a hydraulic control unit 18 is attached to control a reciprocation of a movable cover 181 against the opening 171 and of a push board 182 inside the manifold 17.

The blade wheel 2 is disposed outside the water tank 1 below and to one lateral side of the floater outlet 14. A plurality of blades 21 are provided to respectively axially extend a circumferential surface of the wheel 2.

The chute 3 has a substantially crescent cross section. A top end 31 of the chute 3 is connected to a lower edge of the floater outlet 14 and a lower end 32 of the chute 3 terminates at a point over the blades 21 of the blade wheel 2.

The hopper 4 is disposed below the blade wheel 2. A partition member 41 is provided inside the hopper 4 and a floater feeding hole 42 is formed at a bottom of the hopper 4 near a corner close to the through hole 16 on the water tank 1.

The conveyor 5 is provided on its outer surface with a plurality of carrier boards 51 for holding and conveying floaters 6. A first end 52 of the conveyor 5 extends to a point below the floater feeding hole 42 of the hopper 4 and a second end 53 of the conveyor 5 extends upward from the hole 42 to the opening 171 of the manifold 17.

To use the floater energy generator of the present invention, first close the double-wall airtight gate 15 of the water tank 1 against the floater outlet 14 and the movable cover 181 of the hydraulic control unit 18 against the manifold opening 171 so as to ensure that a space defined by the water tank 1 is in an airtight condition and is completely isolated from the external atmosphere. Start a water pump 122 (see FIG. 7) connected to a lower end of the inlet water pipe 121 to cause water 8 to flow along the inlet water pipe 121 and into the water tank 1 via the water inlet 12. When a water level inside the water tank 1 is close to the lower edge of the floater outlet 14, the pump 122 is automatically stopped. At this point, there is a space 19 left in the top portion of the water tank 1 for accommodating floaters 6. Then, an air pump 132 connected to a lower end of the air pressure regulating pipe 131 is started to discharge air 70 inside the water tank 1 from the air pressure regulating pipe 131 via the air regulating port 13, making a pressure of air 70 and water 8 inside the water tank 1 to be smaller than the external atmospheric pressure 7. Then, move the movable cover 181 away from the manifold opening 171 by operating the hydraulic control unit 18. Since the internal pressure of the water tank 1 is smaller than the external atmospheric pressure, water 8 inside the water tank 1 will not flow out of the tank 1 from the opening 171.

Floaters 6 contained in the hopper 4 roll along the partition member 41 to enter the floater feeding hole 42 and fall onto the conveyor 5 to be carried by the carrier boards 51 of the conveyor 5 into the manifold 17 via the opening 171. When the manifold opening 171 is filled with floaters 6, the hydraulic control unit 18 is started again to move the push board 182 into the manifold 17, pushing floaters 6 near the opening 171 to move toward the through hole 16 and successfully enter a lower portion of the water tank 1. Since the floaters 6 have a density smaller than that of water 8, they are allowed to freely float until they reach the upper space 19 in the tank 1. Repeat the above-mentioned steps shall allow the floaters 6 to fully fill up the entire space 19.

At this point, the hydraulic control unit 18 is operated again so that the movable cover 181 closes the opening 171 again while the air pump 132 is stopped. Then, open the double-wall airtight gate 15 and continuously supply water 8 into the tank 1 until the water surface in the tank 1 exceeds the lower edge of the floater outlet 14. At this point, floaters 6 in the space 19 will be brought by water 8 to flow out of the tank 1 via the floater outlet 14 and fall along the chute 3, impacting on the blades 21 of the blade wheel 2 directly below the chute 3. The impacted blades in turn bring the blade wheel 2 to keep rotating. Since the floaters 6 fall high from the floater outlet 14 onto the blades 21 in an ideal unimpeded falling motion and at an acceleration of gravity, it is possible to successfully transform a potential energy of the floaters 6 into a kinetic energy output. The higher the water tank 1 is, the bigger the potential energy of the floaters 6 has. And, the more the floaters 6 are, the greater the gravity they provide. All of these are factors affecting the magnitude of kinetic energy output. Moreover, the fallen floaters 6 and water 8 can be collected for reuse again.

According to the law of conservation of energy, the energy input by a system shall always equal to the energy output. So, it can be seen that the energy inputs by the structural system of the present invention include a power for the water pump 122, a power for the air pump 132, a power for the hydraulic control unit 18, a power for opening and closing the double-wall airtight gate 15, and a buoyancy of water 8 to the floaters 6, while the energy outputs from the present invention include the potential energy of the floaters 6, an energy loss during the transformation of energy, and the kinetic energy generated by the rotating blades 21 of the blade wheel 2. Among these energy input, the buoyancy of water and the potential energy of floaters are natural forces on physics. Thus, the actual energy loss and yield in the present invention should be evaluated based on the power for the water pump, the power for the air pump, the power for the hydraulic control unit, the power for opening and closing the double-wall airtight gate, and the energy loss during the transformation of energy, and the kinetic energy generated by the rotating blades. Wherein, the kinetic energy generated by the rotating blades accounts for more than 80% of the total energy output, and the other power loss accounts for less than 20% of the total energy output, thus, there is still about 60% of kinetic energy output which can be fully used by the industrial field. Such energy is generated under conditions completely meeting the environmental protection requirement without polluting our living environment, without being restricted by the natural environmental conditions. With the present invention, the employment of a fractional energy consumption shall generate tremendous energy output. In addition, the sources employed in the present invention for generating energy can be repeatedly utilized.

It is to be understood that the form of the invention shown and disclosed is to be taken as a preferred embodiment of the invention and that various changes, modifications, etc. in the shapes, size, and arrangements of parts as well as the steps of implementing the invention may be resorted to without departing from the spirit of the invention.

Figure 7:
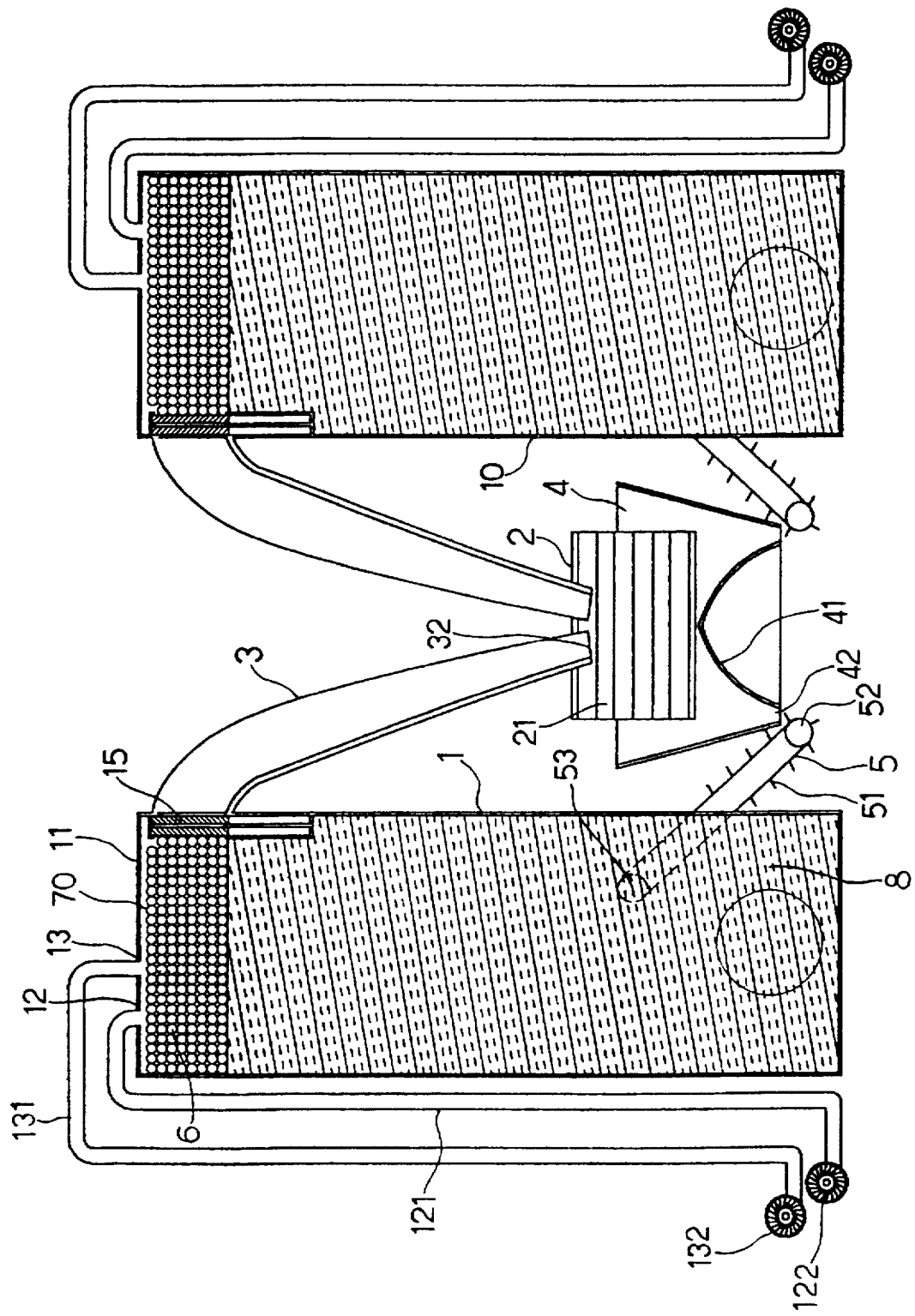
FIGS. 7 and 8 illustrate the structural relations of the water tank, chute, blade wheel, hopper, and conveyor to one another.
Figure 8:
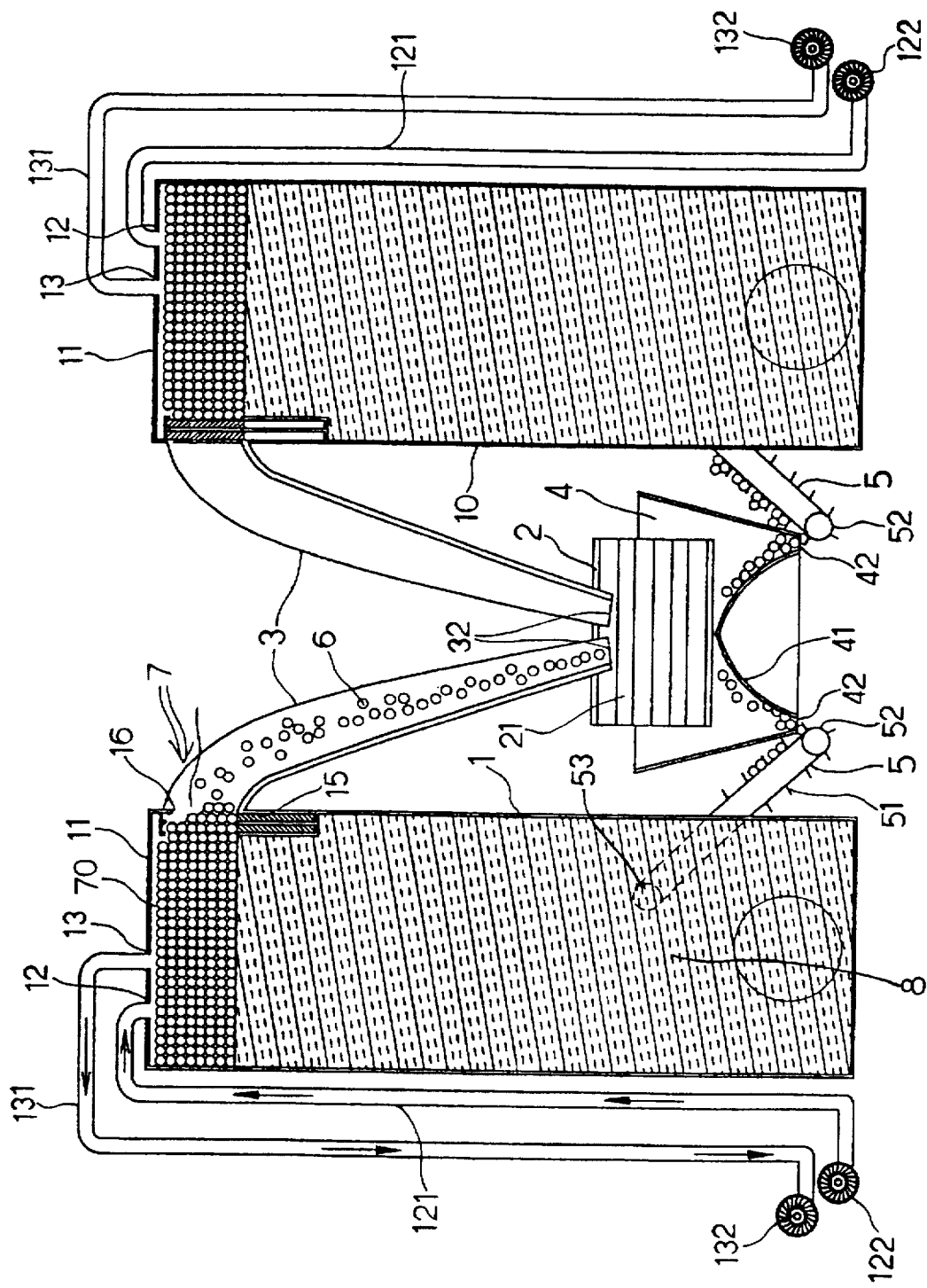

In the above described embodiment of the present invention, since only one single water tank 1 and blade wheel 2 are empolyed, the impaction of floaters 6 on the blades 21 discontinues during the period the floaters 6 are carried to the manifold opening 171 by the conveyor 5 and the floaters 6 are pushed into the water tank 1 by the push board 182. This causes a pause in the operation, that is, an undesired idle time. In another embodiment of the present invention, this is improved by using two water tanks 1, 10 each disposed at one side of the blade wheel 2, as shown in FIGS. 7 and 8. It can be so arranged that the first water tank 1 proceeds the conveyance of floaters 6 while the second water tank 10 releases floaters 6 to impact on the blades 21. The first and the second water tanks 1, 10 work alternately in a cyclic manner such that the blade wheel 2 is kept rotating all the time.

Figure 9:
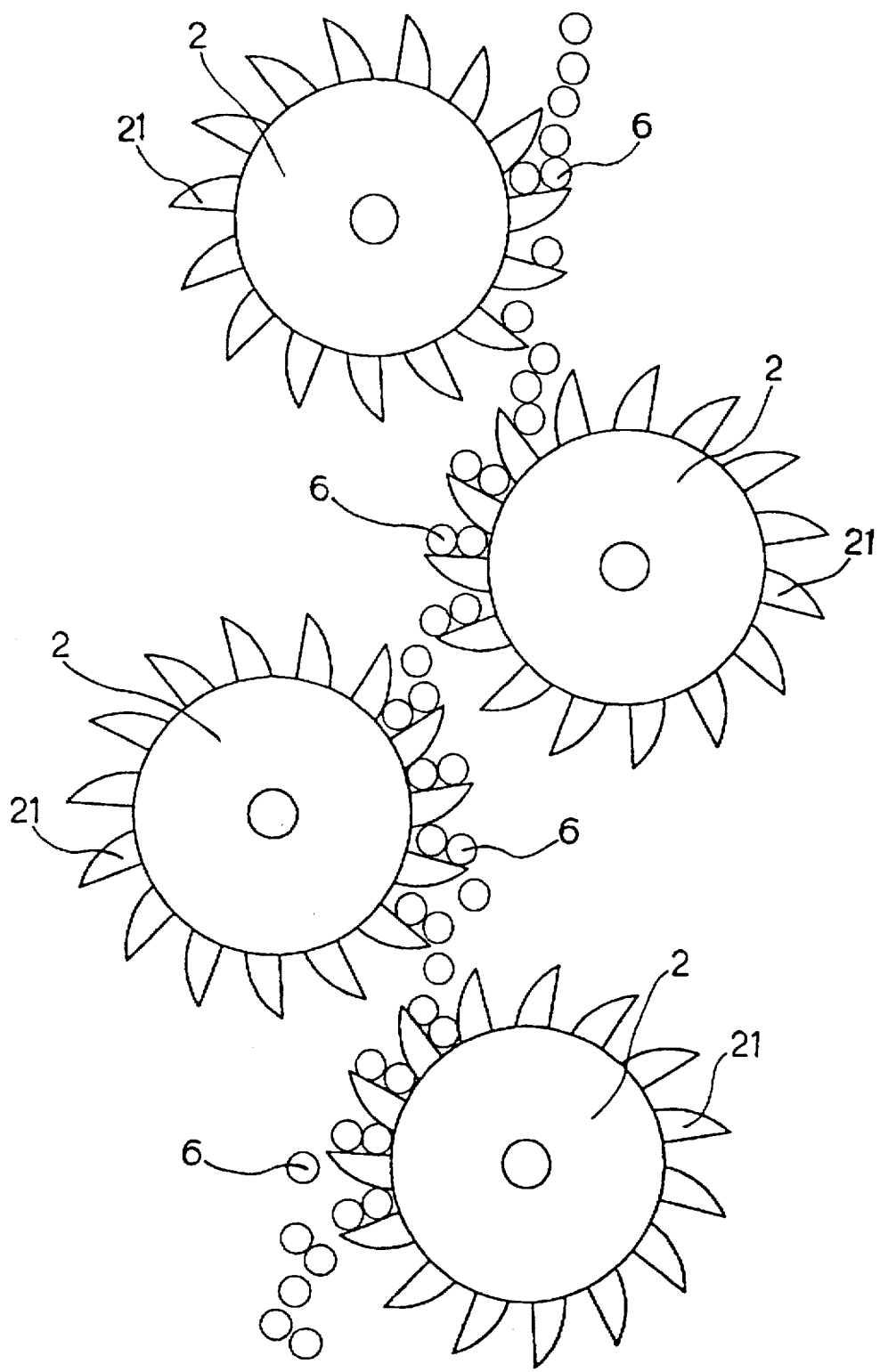
FIG. 9 illustrates a blade wheel series which can be optionally adopted in the present invention.

In a further embodiment, the one single blade wheel 2 is replaced by a series of blade wheels, as shown in FIG. 9. With this arrangement, the potential energy of the falling floaters 6 can be fully utilized.

Figure 10:
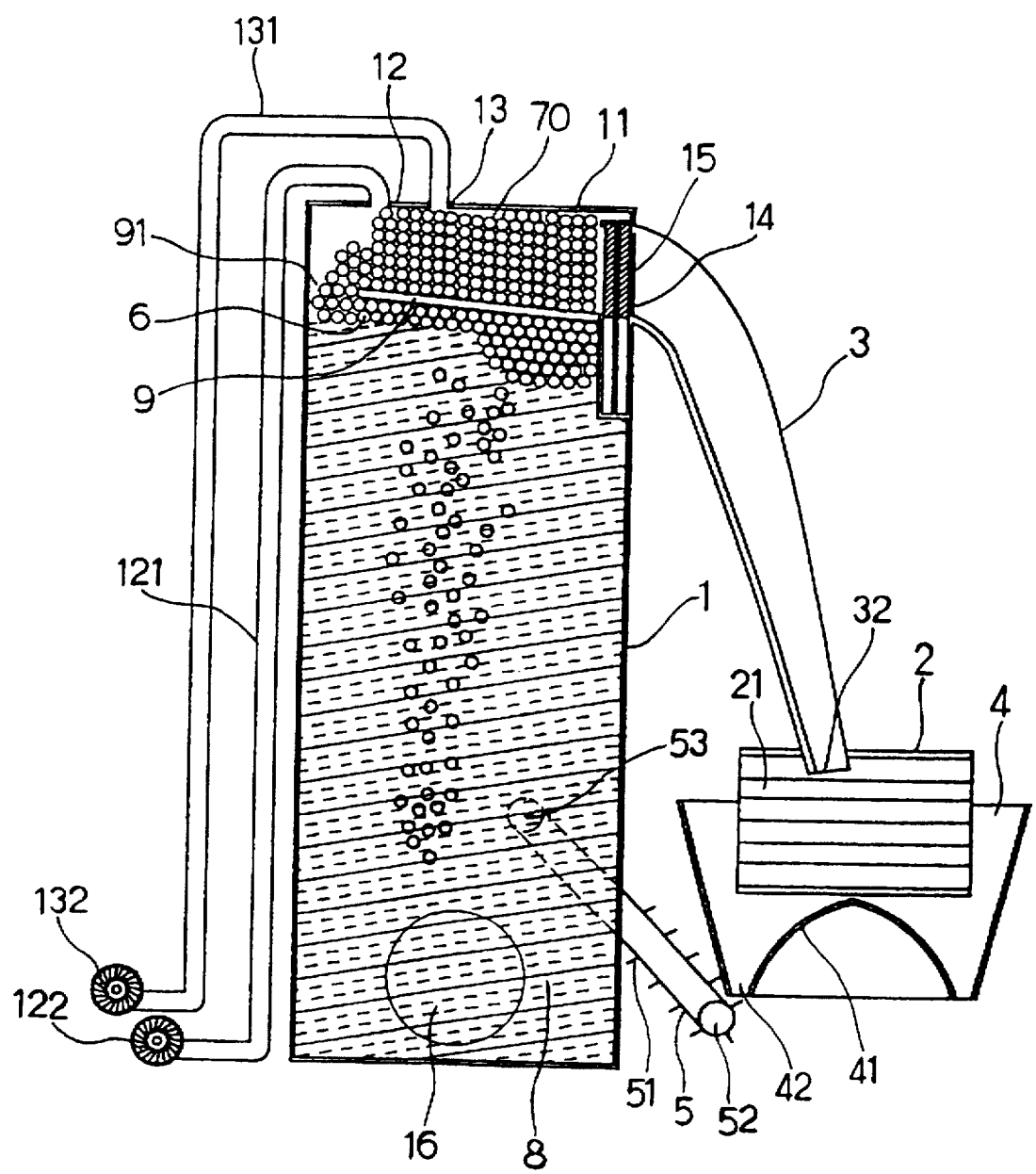
FIGS. 10 and 11 illustrate another embodiment of the present invention.
Figure 11:
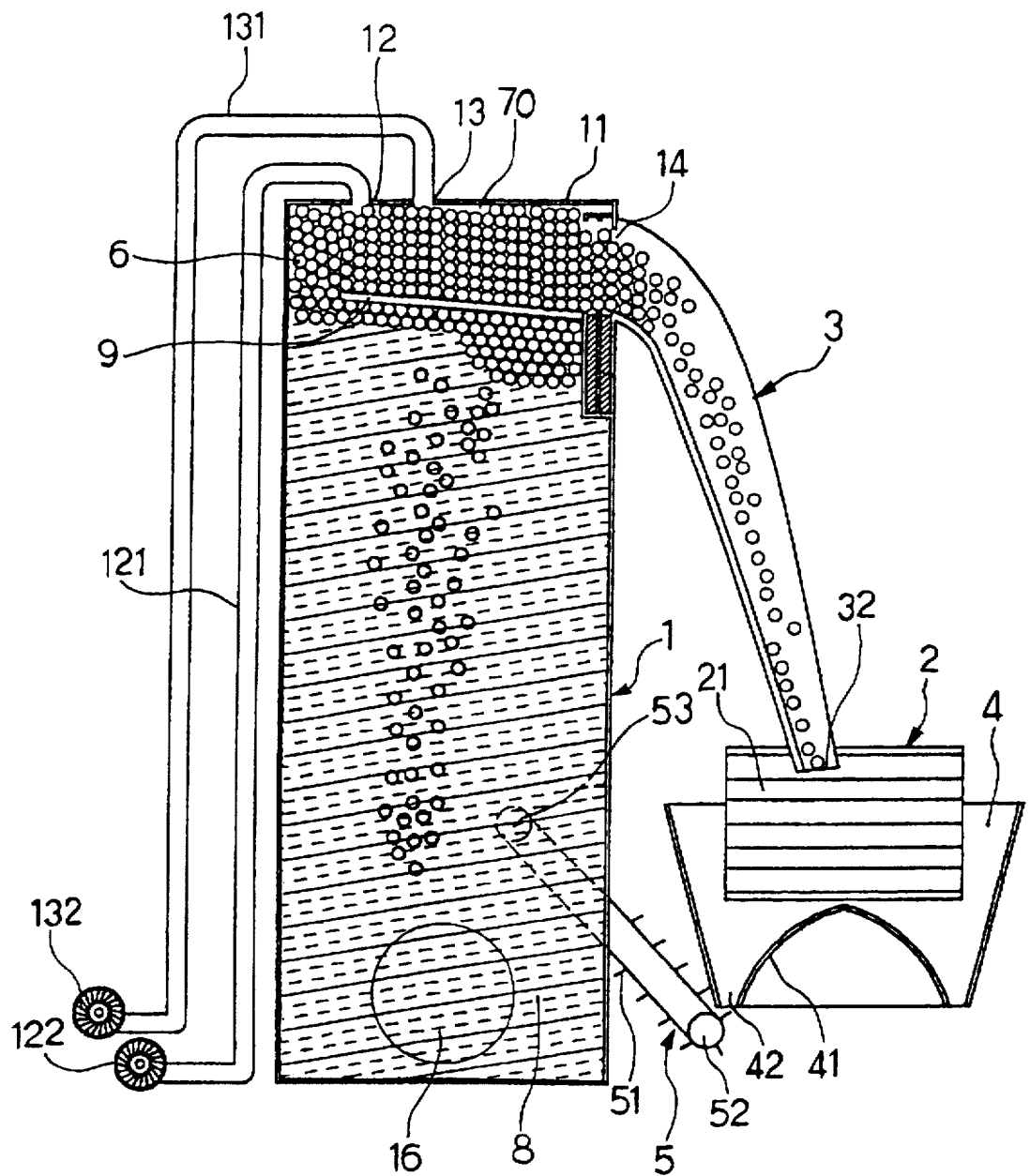

FIGS. 10 and 11 illustrate a still further embodiment of the present invention in which the water tank 1 is provided near the top portion with an inclined stop member 9. The stop member 9 is connected at a lower end to an inner lower edge of the floater outlet 14 and extends upward toward an inner side wall of the water tank 1 opposite to the floater outlet 14, leaving a gap 91 between the stop member 9 and the inner wall of the water tank 1, such that a chamber 19 is formed at the top portion of the water tank 1 and is generally separated from the other part of the water tank 1. When the floaters 6 pass the through hole 16 and enter the water tank 1, they are stopped by and gather below the stop member 9. The gathered floaters 6 gradually move along the inclined stop member 9 to pass through the gap 91 and enter into the chamber 19 above the stop member 9. When the chamber 19 is fully filled with floaters 6, the double-wall airtight gate 15 is opened to let out the floaters 6 in the chamber 19. The coming out floaters 6 pass by the outlet 14 and fall along the chute 3 to impact on the blades 21. With this arrangement, total water supplied to the water tank 1 via the inlet water pipe can be reduced.

What to be noted is the above embodiments are only used for illustrating the present invention, not intended to limit the scope thereof. Many modifications of the embodiments can be made without departing from the spirit of the present invention.

What is claimed is:

1. A floater energy generator, comprising a water tank, a blade wheel, a chute, a hopper, and a conveyor;

said water tank having a closed top cover which isolates an inner space of said water tank from an external atmospheric pressure, a water inlet and an air regulating port formed on said top cover to respectively connect an inlet water pipe and an air pressure regulating pipe thereto, a floater outlet formed on a side wall of said water tank near an upper portion thereof, a double-wall airtight gate mounted to said floater outlet, a through hole provided to said side wall of said water tank near a lower portion thereof and positioned substantially angularly separated from said floater outlet by 90 degrees when viewing from a top plan of said water tank, and a manifold connected to said through hole and outward and upward extended therefrom; to an outer opening of said manifold, a hydraulic control unit being attached to control a reciprocation of a movable cover against said opening and of a push board inside said manifold;

said blade wheel being disposed outside said water tank below and to one lateral side of said floater outlet and having a plurality of blades said chute having a substantially crescent cross section, and having a top end connected to a lower edge of said floater outlet and a lower end terminated at a point over said blades of said blade wheel;

a hopper being disposed below said blade wheel and having a partition member provided therein and a floater feeding hole formed at a bottom thereof; and said conveyor being provided on an outer surface with a plurality of carrier boards for holding and conveying floaters, and having a first end extended to a point below said floater feeding hole of said hopper and a second end extended upward from said floater feeding hole to said opening of said manifold;

said hopper containing a plurality floaters which roll along said partition member to enter said floater feeding hole and fall onto said conveyor, carried by said carrier boards of said conveyor into said manifold opening. The floaters in said manifold opening being pushed into said manifold and entering said water tank via said through hole by said hydraulic control unit, the floaters in said water tank floating into a space between said top portion of said water tank and an upper surface of water in the tank such that, when the floater outlet is opened, floaters pass down the chute and impact the blades of said blade wheel, thereby imparting rotation to said blade wheel.

2. A floater energy generator as claimed in claim 1, further comprising a second water tank located adjacent to another side of said blade wheel, whereby when one of said water tanks is releasing floaters to impact on said blades, the other said water tanks is letting in floaters.

3. A floater energy generator as claimed in claim 1, further comprising a plurality of blade wheels arranged in series.

4. A floater energy generator as claimed in claim 1, further comprising an inclined stop member located in the water tank at a top portion and having a lower end connected to an inner lower edge of said floater outlet and extending upwardly toward an inner side wall of said water tank opposite to said floater outlet, leaving a gap between said stop member and said inner wall of said water tank, such that a chamber is formed at said inner top portion of said water tank above said stop member.

* * * * *